Patented Sept. 14, 1948

2,449,088

UNITED STATES PATENT OFFICE 2,449,088

OCTA-CHLORO-BIPHENYL QUINONE

Franklin D. Smith, Webster Groves, Mo., assignor to Monsanto Chemical Company, St. Louis, Mo., a corporation of Delaware No Drawing. Application July 23, 1945,
Serial No. 606,723

1 Claim. (Cl. 260—396)

This invention relates to dihydroxy octa-chlorobiphenyl and octa-chlorobiphenyl quinone and to a process for producing same.

The principal object of the invention is to provide a commercially feasible process by which the above new compounds may be produced in a practically pure form and in substantially quantitative yields.

Other objects of the invention will be apparent to those skilled in the art as the description proceeds.

Dihydroxy octa-chlorobiphenyl may be prepared by reacting deca-chlorobiphenyl with alcoholic potassium hydroxide in an amount sufficient to replace two chlorine atoms by hydroxyl groups. For this purpose I preferably employ up to about a 10% molar excess of KOH over that theoretically required to produce the dihydroxy compound. In place of KOH, sodium hydroxide, ammonium hydroxide, sodium carbonate and other alkaline compounds which provide hydroxyl groups under the reactive conditions of the process may be employed.

Octa-chlorobiphenyl quinone may be prepared by one of the following methods.

One method consists in preparing dihydroxy octa-chlorobiphenyl in the above described manner and then converting this compound into the corresponding quinone by oxidation.

The second method involves reacting deca-chlorobiphenyl with an alcoholic solution of an "alkaline compound" to introduce at least two hydroxyl groups and then oxidizing the resulting chlorohydroxy compound by means of a combined oxidizing and chlorinating agent. This is preferably accomplished by reacting deca-chlorobiphenyl with alcoholic KOH, preferably a methanol solution of KOH, to form a chlorohydroxy compound and then oxidizing the latter by means of aqua regia or an equivalent oxidizing agent. This is the preferred method because it does not require that the deca-chlorobiphenyl and the alcoholic potassium hydroxide be accurately proportioned so as to yield the dihydroxy derivative. Thus if more than two chlorine atoms of deca-chlorobiphenyl are replaced by hydroxyl groups, oxidation of the intermediate still yields the desired product since all but two hydroxyl groups (which are converted to oxo groups) are replaced by chlorine through the chlorinating action of the oxidizing agent.

Dihydroxy octa-chlorobiphenyl and octa-chlorobiphenyl quinone may be employed for a great variety of purposes. For example, dihydroxy octa-chlorobiphenyl finds use as a germicide and octa-chlorobiphenyl quinone is adapted for use as an insecticide, a fungicide, a herbicide, a fireproofing compound, a stabilizer for dielectric compositions, an oil addition agent, a pigment for plastics, paints, varnishes and lacquers, and as an intermediate in the production of dyestuffs.

The above hydroquinone (dihydroxy octa-chlorobiphenyl) and the corresponding quinone (octa-chlorobiphenyl quinone) may be represented generically by the following structural formula:

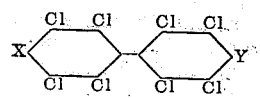

wherein both X and Y are selected from the class consisting of oxo and hydroxyl groups, it being understood that the unsaturated bonds (not shown) occupy different positions in the formula depending upon the substituents X and Y.

Thus when X and Y are both oxo groups, the above formula takes the following form:

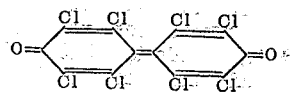

On the other hand, when X and Y are both hydroxyl groups, the double bonds occupy different positions and the structural formula is then represented as follows:

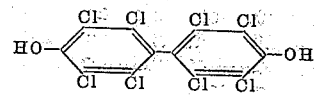

For a more complete understanding of the present invention, reference is made to the following specific examples, it being understood that these embodiments are merely illustrative and are in no way limitative of the scope of the invention.

Example I 50 grams of deca-chlorobiphenyl, 12 grams of KOH and 250 cc. of ethylene glycol were mixed together and refluxed for 8 hours. The solution thus obtained was diluted with water to a volume of 1 liter and an excess of KOH was added to form a clear solution which was filtered and acidified with HCl. The precipitated product consisting essentially of dihydroxy octa-chlorobiphenyl was filtered, dried in a vacuum oven and ground to a white crystalline powder.

Example II 30 grams of deca-chlorobiphenyl, 60 grams of potassium hydroxide, 75 cc. of methanol and 75 cc. of water were charged into an autoclave and heated to a temperature of 180° C. for 14 hours. At the end of this time, the reaction mixture was filtered to remove unreacted deca-chlorobiphenyl, whereupon the filtrate was acidified with concentrated HCl. The resulting precipitate was filtered, weighed and dried and 26.7 grams of dihydroxy octa-chlorobiphenyl was obtained which represented a product yield of 99% of theory.

Example III 50 grams of deca-chlorobiphenyl, 25 grams of KOH and 250 cc. of ethylene glycol were mixed together and refluxed for six hours. The resulting product was poured into water and after making certain that the solution was basic, it was filtered. The filtrate was then acidified with concentrated hydrochloric acid and the white chlorohydroxy product recovered by filtration.

The product thus obtained was treated while stirring with an excess of aqua regia (1 volume of concentrated nitric acid to 4 volumes of concentrated hydrochloric acid). The reaction mixture was thereupon heated slowly to 35° C. and as the reaction progressed the white crystalline hydroxy derivative was converted into an orange colored solid. At the end of six hours, the reaction mixture was allowed to stand overnight whereupon it was poured into water and filtered. The filter cake consisting of octa-chlorobiphenyl quinone was then washed with water and dried at room temperature.

Example IV 500 grams of deca-chlorobiphenyl, 250 grams of KOH, 1500 cc. of ethylene glycol and 2 cc. of water were mixed together and refluxed with stirring for a period of eight hours. The resulting product was poured into 2 liters of water and after making certain that the solution was basic, it was filtered. The filtrate was acidified with concentrated hydrochloric acid and the precipitate produced was filtered and washed with cold water. The moist precipitate was allowed to stand overnight and then it was heated in a beaker with 2500 cc. of aqua regia to convert the chlorohydroxy derivative into octa-chlorobiphenyl quinone. This product was soluble in methanol and ethanol and on analysis was found to contain 60.19% chlorine as compared with 61.6% Cl, the theoretical chlorine content of octa-chlorobiphenyl quinone.

Example V 100 grams of deca-chlorobiphenyl, 500 cc. of ethylene glycol, 50 grams of KOH and 2 cc. of water were refluxed for eight hours and then the resulting solution was filtered to remove a small amount of undissolved solid material. After dilution with 1300 cc. of cold water, the filtrate was filtered, using Filter-Cel, and then acidified with an excess of concentrated hydrochloric acid. This resulted in the production of a hard, lumpy brownish precipitate which, upon reaction with 500 cc. of aqua regia ($4HCl:1HNO_3$), yielded an orange colored crystalline product. The reaction mixture, after standing overnight, was diluted with water to a volume of two liters and filtered. The filter cake was then dried overnight at a temperature of about 75 to 80° C. and ground to a powder in a mortar. 86 grams of octa-chlorobiphenyl quinone was obtained, a product yield of 93.5% of theory.

Example VI 2000 grams of deca-chlorobiphenyl, 10 liters of ethylene glycol, 1000 grams of KOH and 35 cc. of water were mixed together and refluxed in a 12 liter flask for 8 hours. At the end of this period, the reaction mixture was filtered through a bed of Filter-Cel, using glass filter cloth, and then acidified with concentrated hydrochloric acid. The chlorohydroxy compound precipitated as a result of acidification was separated from the solution by filtration and reacted with a mixture of 5 liters of concentrated HCl and 1 liter of concentrated nitric acid. The reaction mixture was then allowed to stand at room temperature for 36 hours and after dilution with water, it was filtered. The filter cake consisting of octa-chlorobiphenyl quinone was washed with water and dried in an oven for 24 hours at a temperature of 80° C.

In converting deca-chlorobiphenyl into dihydroxy octa-chlorobiphenyl, I employ an alcoholic solution containing a sufficient amount of an "alkaline compound" to supply two hydroxyl groups per mole of the chlorinated compound, but a slight excess (up to about a 10% molar excess) of the "alkaline compound" is preferred since this insures the formation of a product consisting essentially of the dihydroxy derivative.

When octa-chlorobiphenyl quinone is the desired end product and the intermediate is to be converted by means of an oxidizing agent which has no chlorinating action, it is essential that the deca-chlorobiphenyl and the "alkaline compound" be accurately proportioned so as to form dihydroxy octa-chlorobiphenyl, otherwise oxidation of the intermediate will not yield octa-chlorobiphenyl quinone. However, if a combined oxidizing and chlorinating compound such as aqua regia is employed, then an accurate adjustment of the above reactants is not necessary provided the "alkaline compound" is used in an amount sufficient to replace at least two chlorine atoms of deca-chlorobiphenyl by hydroxyl groups.

When more than two chlorine atoms of deca-chlorobiphenyl are substituted by hydroxyl groups through the use of a large excess of the "alkaline compound," oxidation by means of aqua regia or its equivalent still yields octa-chlorobiphenyl quinone. The reason for this is that the hydroxyl groups in the para positions are oxidized by aqua regia to the corresponding oxo groups whereas the remaining hydroxyl groups are substituted by chlorine atoms through the chlorinating action of the aqua regia.

In general, I employ from 2 to 4.5 moles of the "alkaline compound" per mole of deca-chlorobiphenyl, but it is to be understood that a larger molar excess of the former compound is within the scope of the present invention.

After the reaction between deca-chlorobiphenyl and the "alkaline compound" has gone to completion, the reaction mixture, if it is not already in this condition, is rendered basic by the addition of a suitable alkali. The basic solution is thereupon filtered to remove solid impurities and then acidified, preferably by means of concentrated hydrochloric acid, in order to precipitate the chlorohydroxy compound. This compound is then oxidized by means of aqua regia to form octa-chlorobiphenyl quinone. In this reaction the quantity of oxidizing agent may be varied widely so long as the theoretical requirements are met, but I prefer to employ an excess of this material. The degree of excess depends to a large extent on the quantity of "alkaline compound" employed in the initial step of the process. If a large excess of "alkaline compound" is employed in this reaction and more than two chlorine atoms of deca-chlorobiphenyl are replaced by hydroxyl groups, then a large excess of aqua regia must be used. On the other hand if only a slight excess of the "alkaline compound" is employed, then the amount of aqua regia used may approach more closely the theoretical requirements.

In addition to aqua regia, other oxidizing agents such as nitric acid, $KClO_3$ in concentrated HCl, $K_2Cr_2O_7$ in HCl, etc. may be used. The only limitation on the oxidizing agent is that it must be effective in acid solution.

The optimum oxidation temperature varies with the reagent but when aqua regia is employed I prefer to carry out this reaction at about 35° C.

The temperature used to dry dihydroxy octa-chlorobiphenyl and octa-chlorobiphenyl quinone is not critical. It may vary from room temperature up to 80° C. depending upon the rapidity with which it is desired to dry the product. Much higher temperatures may also be utilized so long as those temperatures producing substantial decomposition are avoided.

Where reference is made to an "alkaline compound" in the specification and claims, it is to be understood that this expression covers the alkaline compounds specifically mentioned herein and also those alkaline compounds which supply hydroxyl groups under the reactive conditions of the process.

While I have described my invention in detail, it should be understood that many changes may be made therein without departing from the spirit thereof.

What I claim is:

As a new product, octa-chlorobiphenyl quinone.

FRANKLIN D. SMITH.

REFERENCES CITED

The following references are of record in the file of this patent:

UNITED STATES PATENTS

| Number | Name | Date |
|---|---|---|
| 1,995,568 | Jacobi | Mar. 25, 1935 |
| 2,353,724 | Gump | July 18, 1944 |

OTHER REFERENCES

Karrer, "Organic Chemistry," page 531.

Richter's "Organic Chemistry," vol. II, translated by D'Albe, pages 557–558.